March 19, 1968     B. STAHMER     3,374,319

CABLE TAKE-UP REEL

Filed April 25, 1966     4 Sheets-Sheet 1

INVENTOR
BERNHARDT STAHMER

BY *George R. Kummer*

ATTORNEY

INVENTOR
BERNHARDT STAHMER

BY George R Nimmer
ATTORNEY

March 19, 1968  B. STAHMER  3,374,319
CABLE TAKE-UP REEL

Filed April 25, 1966  4 Sheets-Sheet 3

INVENTOR
BERNHARDT STAHMER

BY *George R. Mummer*

ATTORNEY

March 19, 1968  B. STAHMER  3,374,319
CABLE TAKE-UP REEL

Filed April 25, 1966  4 Sheets-Sheet 4

INVENTOR
BERNHARDT STAHMER

BY George R. Vimmer
ATTORNEY

United States Patent Office 3,374,319
Patented Mar. 19, 1968

3,374,319
CABLE TAKE-UP REEL
Bernhardt Stahmer, 1509 Chicago St.,
Omaha, Nebr. 68102
Filed Apr. 25, 1966, Ser. No. 544,984
8 Claims. (Cl. 191—12.4)

This invention relates to spool type reel apparatuses suitable for the storage, unwinding, and rewinding of flexible power lines such as electrical cables or fluid conducting hoses upon a rotatable spool that is biased against a spring means, said spool type reel apparatuses being generically referred to as "cable take-up reels." In particular, this invention relates to a cable take-up reel that is unusually simple and economical to manufacture, that possesses an extremely efficient means for attaching the spring means to the rotatable spool component, and that provides an exceedingly simple and convenient means for replacing the flexible output power line carried by the spool component.

In supplying mobile equipment from a static point with output power, e.g. electrical connections, gas, or water supply, a flexible cable or hose may be employed which is stored on a rotatable spool and payed off as required by rotation of the spool. The rotatable spool is biased against spring tension as the output power cable is payed out so that the output power cable will automatically retract and rewind upon the spool as the powered mobile equipment returns in a direction toward the cable take-up reel. In such an arrangement, there is an input power cable leading from the original power source to the spool, and because of the revolvable nature of the retractable spool, there must be a revolvable joint between the input and output power cables. In the case of fluid power, e.g. compressed air, hydraulic fluids, etc., the joint means may be a swivel or related device, sometimes referred to as a "fluid slip ring." In the case of electrical power, a combination of brushes, slip rings, and an intermediate cable between the input and output power cables serve as the revolvable joint, the number of brushes and slip rings being at least equal to the number of electrically-conductive strands contained within the input, intermediate, and output power cables.

During sustained operation of a cable take-up reel apparatus, the intermediate and output power cables are apt to fail, break, or become damaged, either the entire cable or a member strand contained therein. Further, it is oftentimes required to change the type of input, intermediate, and output cables employed, especially in order to utilize heavier guage strands or a different number of contained strands depending upon the requirements of the mobile equipment. With prior art reel devices it is normally a very time-consuming and intricate operation to replace damaged or operationally inappropriate intermediate and output power cables because normally the entire reel apparatus must be substantially disassembled.

Another common failure point during sustained operation of cable take-up reels concerns the spring-biasing means, which is normally of the helical spring type. Recently, the helical spring biasing means, designated as a "spring motor" in the art, has been mounted externally of the reel apparatus, adjacent to the spool supporting means, for the ostensible purpose of facilitating replacement of a faulty, damaged, or broken spring. However, the externally mounted "spring motors" of the prior art have not proven to be simple to install and reinstall. Further, externally mounted "spring motors" of the prior art have utilized terminal split collars on the flanged spool supporting shaft, said terminal split collars being necessarily of bulky diameter, thus substantially limiting the resultant mechanical advantage or "leverage" of the "spring motor" exerted between the reel frame and the rotatable flanged spool or its co-rotatable supporting shaft. In addition, it is difficult to adjust the tension of the prior art "spring motors" appropriate to the desired length of travel for the output power cable.

It is accordingly the general object of the present invention to overcome the disadvantages and deficiencies of the prior art.

It is another object of the present invention to provide an exceedingly simple and convenient means for replacing the output power cable line carried by the rotatable flanged spool.

It is another object of the present invention to provide a quick and simple means for connecting the multi-conductor intermediate cable between the collector rings and the multi-conductor output power cable.

It is yet another object to provide a cable take-up reel that can be economically manufactured through the use of sheet steel parts, thus dispensing with the necessity for certain cast and forged parts.

It is yet another object of the present invention to provide an improved means for adjusting the tension of the spring motor.

It is yet another object to provide an extremely efficient and accessible means for applying spring tension between the reel apparatus frame and the rotatable spool component through its associated rotatable shaft.

It is another object of the present invention to incorporate the aforesaid objects and advantages into a twin cables reel embodiment in order to provide a means for simultaneously supply both electrical and gaseous fluid power to a mobile arc-welding station.

With the above and other objects and advantages in view which will become apparent as the description proceeds, the invention comprises the novel form, combination, and arrangement of parts as hereinafter more fully described, reference being had to the accompanying drawings wherein like numbers refer to like parts in the several views and in which.

Figure 1:
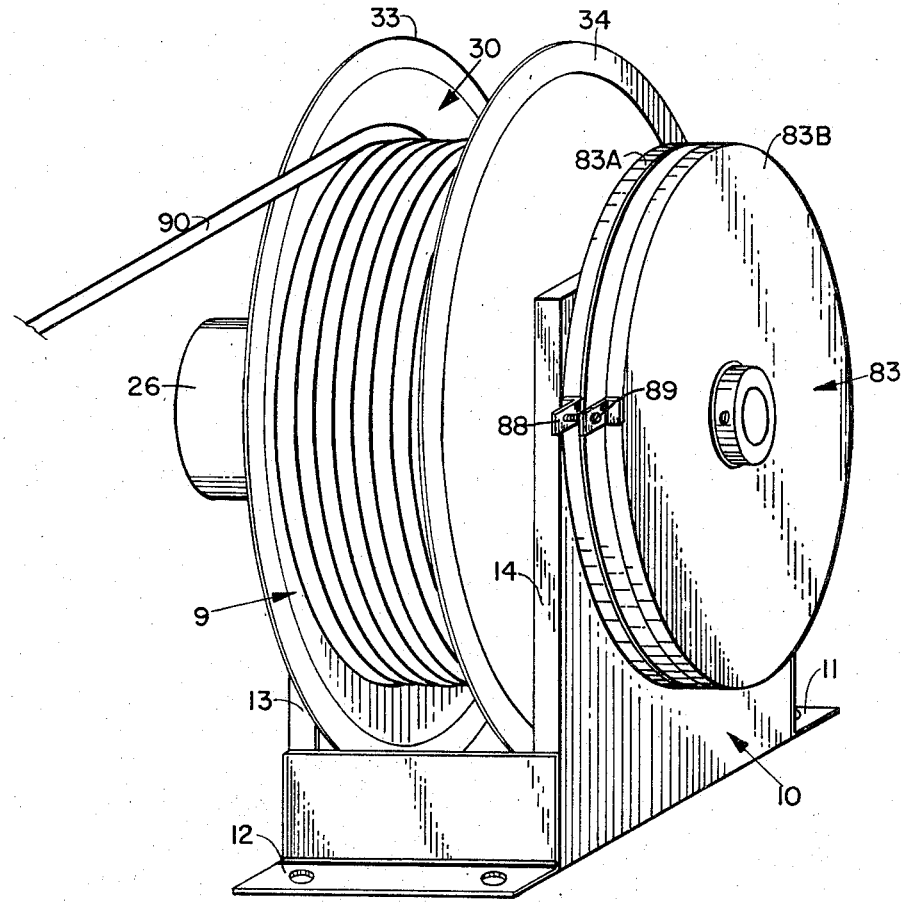
FIGURE 1 is a perspective view of the cable take-up reel of the present invention.

The cable take-up reel 9 of the present invention comprises a frame member 10; a tubular shaft 20 revolvably supported by frame member 10, said tubular shaft 20 having a medial slot 21; a spool member 30 surrounding and having a fixed longitudinal relationship with respect to shaft 20, spool 30 being revolvable with respect to the longitudinal central axis of shaft 20, spool 30 having a drum band 31 and a pair of opposed flanges 33 and 34 integrally attached to the respective ends of intervening drum band 31, the drum band 31 having an opening 35 that overlies elongate lateral slot 21; an adapter cover member 50 removably attached across the drum band opening 35, said cover member 50 having an opening 51 to permit passage of a cable 90 and an integral electrical connector 97 adapted to engage cable 90; and a helical spring 90; and a helical spring 80, the outer end 81 being connected between frame member 10 remote of tubular shaft 20 and the inner end 82 of spring 80 being connected to the second end 20B of shaft 20.

Frame member 10 comprises a base portion, herein as a pair of opposed parallel angle irons 11 and 12, adapted to rest stably upon a horizontal surface. There is at least one upright side member attached uprightly to the base portion to horizontally support tubular shaft member 20. As can best be seen in FIGURE 3, a pair of upright opposed side members 13 and 14 are employed; each side member comprises a rectangular strip of heavy gauge sheet metal with peripheral portions being bent perpendicular to the main body of the strip toward spool member 30 to provide structural strength for each respective side member 13 and 14. Each side member 13 and 14 is provided with a central perforation, the respective central perforations being of substantially the same dimensional size and being positioned in horizontal alignment across frame member 10 to accommodate tubular shaft 20. The respective side members are provided with journal means to revolvably support elongate tubular shaft 20, herein as ball bearing units 15 surrounding the central perforation of respective side panels 13 and 14.

Elongate tubular shaft 20 extends outwardly of frame member 10 beyond side members 13 and 14. To provide a revolvable joint between the multi-conductor input cable 92 and output cable 90, the first end 20A of revolvable tubular shaft 20 includes an integral collector ring assembly 23 comprising a plurality of metallic member rings 24, each ring being concentric about the longitudinal central axis of shaft 20. The various member rings 24 are electrically insulated from each other and from shaft 20 as with an electrically insulative bushing member 25 that provides an integral connection between member rings 24 and revolvable shaft 20. A generally cylindrical housing member 26 attached to the exterior side of side member 13 encloses collector ring assembly 23. Housing member 26 includes an entrance ring 27 through which the input power is supplied as by means of a multi-conductor cable 92 having two separate electrically-conductive wires 93 and 94 enclosed therein. The respective wires of the input power cable 92 are each connected to a member ring 24 by means of stationary brush members (as shown) as is well known in the art.

Figure 3:
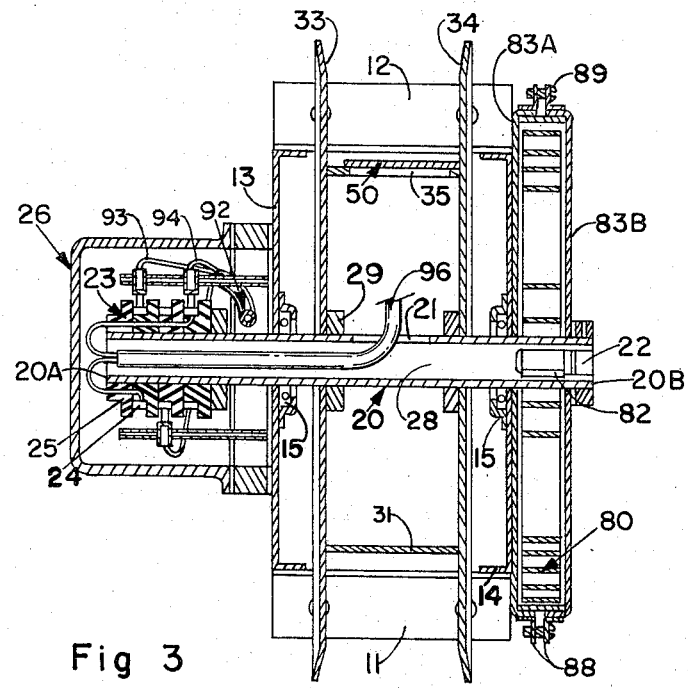
FIGURE 3 is a sectional view taken along line 3—3 of FIGURE 2.
Figure 7:
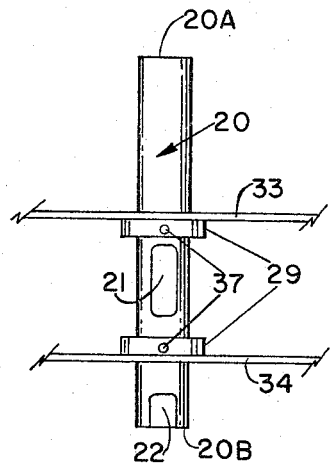
FIGURE 7 is a detail perspective view of the elongate tubular shaft component.
Figure 4:
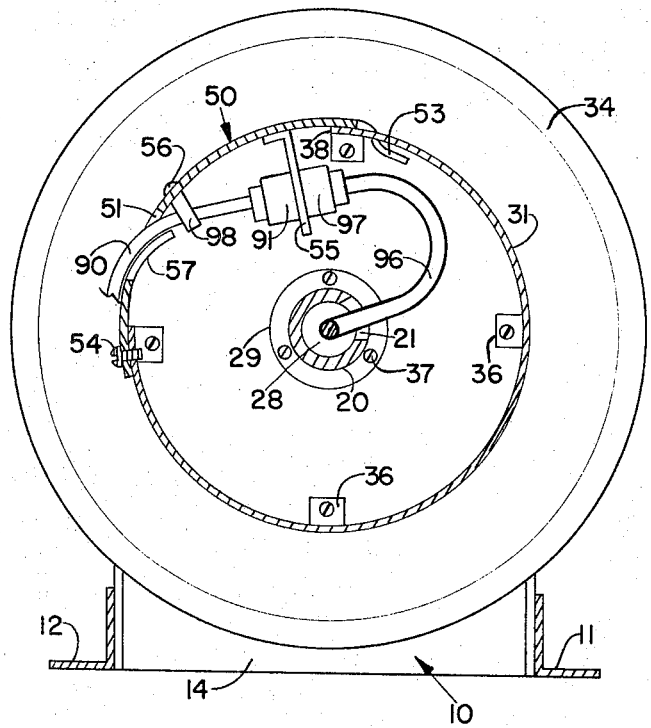
FIGURE 4 is a sectional view taken along line 4—4 of FIGURE 2.

As can best be seen in FIGURES 3 and 4, elongate tubular shaft 20 has a bore 28 along the longitudinal central axis commencing at the first end 20A. There is an elongate medial slot 21 transversely of bore 28, and there may be an elongate terminal slot 22 at shaft second end 20B. Shaft 20 is provided with a pair of flanged collars 29 attached to said shaft 20 as with set screws 37, and the distance between the collar flanged portions is substantially equal to the distance between spool flanges 33 and 34.

Figure 8:
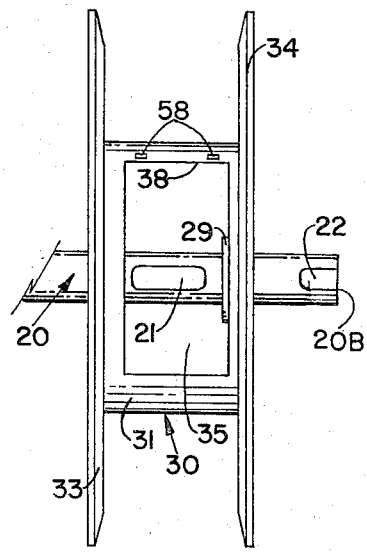
FIGURE 8 is a top plan view of the spool member component.

Spool member 30 has a cylindrical drum band 31 and a pair of substantially parallel opposed flanges 33 and 34 integrally attached to the intervening drum band 31 as by means of four diametrically positioned L-shaped brackets 36, an arm of each bracket being attached to drum band 31 and to spool flange. The periphery of the circular flanges 33 and 34 is bent outwardly of the reel apparatus in conventional fashion. As illustrated in FIGURE 8, the drum band 31 has a lateral opening 35 having a rearward edge 38. As can best be seen in the FIGURE 1 perspective view, spool 30 accommodates a length of output power cable 90 convolutely wound about drum band 31 between spool flanges 33 and 34. Normally output cable 90 would have contained therein the same number of electrical wires as does input cable 92, herein two in number.

Spool member 30 surrounds shaft 20 and is integrally joined thereto as by means of screws 37 joining the flanges of collars 29 to spool flanges 33 and 34. Thus, spool 30 has a fixed longitudinal relationship along shaft 20 and is directly revolvable therewith. The drum band lateral opening 35 preferably directly overlies the shaft medial slot 21.

Figure 6:
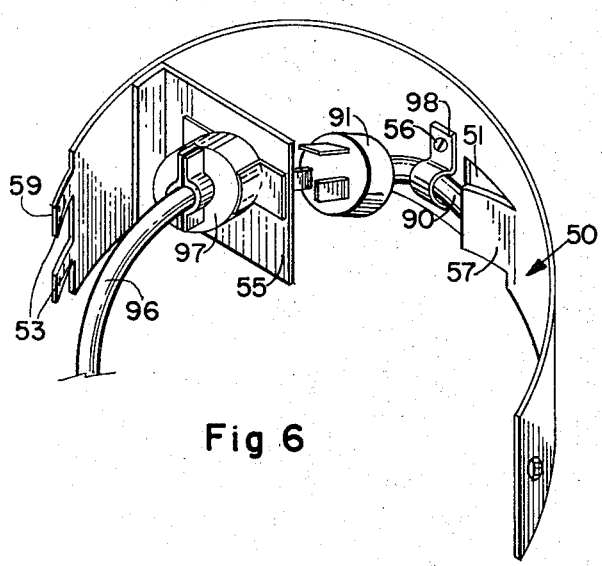
FIGURE 6 is a detail perspective view of the removable adapter cover member portion.
Figure 2:
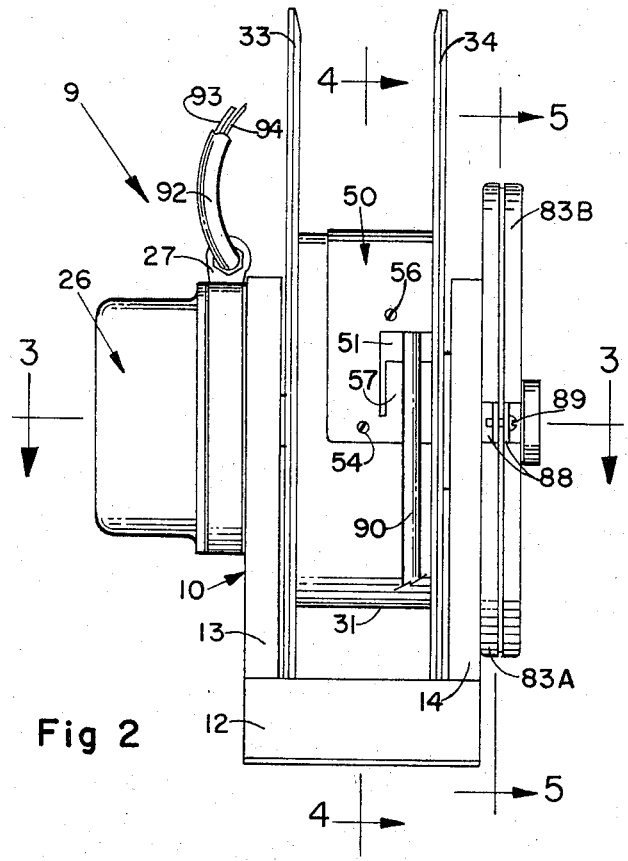
FIGURE 2 is a front elevational view of the cable take-up reel of the present invention.

The adapter cover 50 of FIGURE 6 is of general curvilinear configuration to coincide with the cylindrical contour of drum band 31. The curvilinear body of adapter cover 50 is dimensionally greater than drum band opening 35, and adapter cover 50 preferably completely surrounds drum band opening 35 when the concave interior surface of cover 50 is abuttably positioned over the convex exterior surface of drum band 31. The rearward extremity 59 of adapter cover 50 includes a pair of integral prongs 53 which are adapted to slip through perforations of drum band 31 rearwardly of drum band opening 35. Adapter cover 50 is attached to drum band 31 as with a screw fastener 54. The interior side of adapter cover 50 includes an L-shaped bracket 55, one arm of which is attached to cover 50. The downwardly extending other arm of bracket 55 carries a coupling device, herein as a female socket terminus 97 for intermediate power conduit 96, said intermediate power conduit to be explained later in great detail. Output power conduit 90 enters through opening 51 of adapter cover 50 and extends therebeneath by passing along a downwardly extending tab portion 57 and the output power conduit 90 terminates with a male plug portion 91 adapted to engage female plug portion 97 carried by bracket 55. Alternatively, the female plug portion could be carried by output conduit 90 and the male plug portion could be carried by the intermediate power conduit 96. As can best be seen in FIGURE 4, there may be a strain-relief clamp 98 attached to the underside of adapter cover 50 as with screw 56 for supporting the terminal end of output power conduit 90.

The intermediate power conduit 96 passes between collector rings 24, along shaft bore 28, through shaft medial slot 21, and terminates at L-shaped bracket 55 with female socket 97. Intermediate power conduits 96 has as many electrical conductor wires contained therein as is the case with input conduit 92 and output power conduit 90, herein two in number, and the respective contained conductors are connected to collector rings 24.

There is a disc-like casing 83 for enclosing helical spring 80, said casing 83 comprising two mating circular portions including an inward (herein leftward) portion 83A and an outward (herein rightward) portion 83B. Inward portion 83A is affixed to frame member 10, as by spot welding against the exterior surface of side panel 14. The outer terminus 81 and the inner terminus 82 of helical spring 80 are provided of a hook-like configuration. Outer terminus 81 is engaged with a J-shaped bracket 84 attached to the inner surface of outward portion 83B and the inner terminus 82 extends to shaft second end 20B and is engaged to the shaft with suitable shaft attachment means. The respective mating portions 83A and 83B of casing 83 are each provided with a plurality of outwardly-extending perforate ears 88, and the mating portions 83A and 83B are held together by means of removable fasteners e.g. bolts 89, passing through the aligned perforations of the ears 88. Although any convenient number of perforate ears 88 may be utilized on each casing portion, as shown in the drawing, two diametrically opposed ears on each casing portion will suffice. The casing attachment means 88 and 89 allow the outward portion 83B and the associated helical spring 80 to be rotated with respect to inward portion 83A thus tightening or loosening the convolutions of spring 80 depending upon the desired length of travel for output power cable 90.

Figure 5:
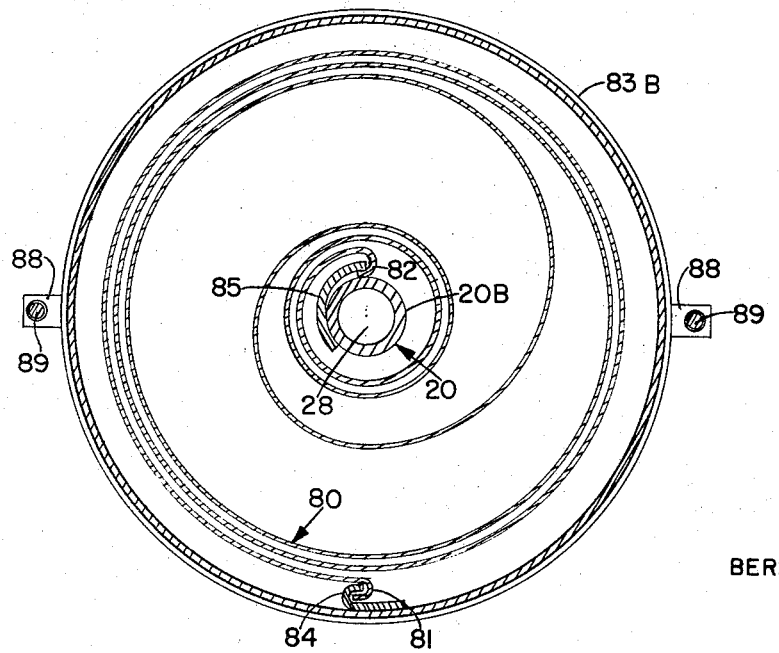
FIGURE 5 is a sectional view taken along line 5—5 of FIGURE 2.

The shaft attachment means is preferably located as close as possible to the longitudinal axis of shaft 20 so as to provide the maximum mechanical advantage for spring 80 between rotatable spool 30 and stationary frame 10, herein at a peripheral portion 84 of stationary casing 83B. One type of shaft attachment means includes the lip 85 of FIGURE 5 attached as by welding tangentially of shaft second end 20B. Alternatively, spring inner end 82 can be directly engaged to shaft second end at terminal slot 22; the slot-type attachment means is preferred for simplicity, economy, strength, and being located nearer to the shaft longitudinal axis provides an especially great mechanical advantage for spring 80.

Figure 9:
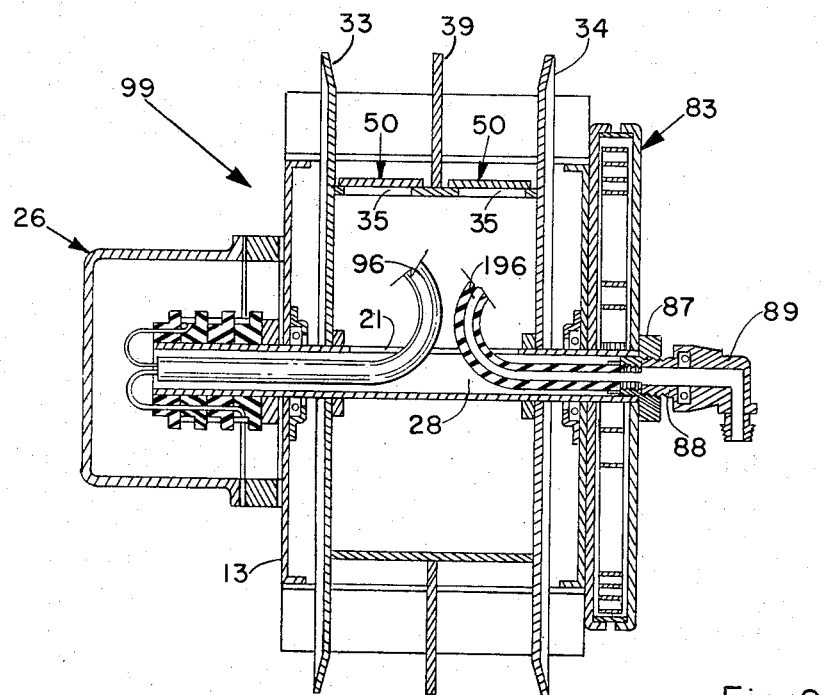
FIGURE 9 is a sectional view similar to that of FIGURE 3 for a twin cables reel embodiment of the present invention adapted to simultaneously supply fluid and electrical power to a mobile arc-welding station.
Figure 10:
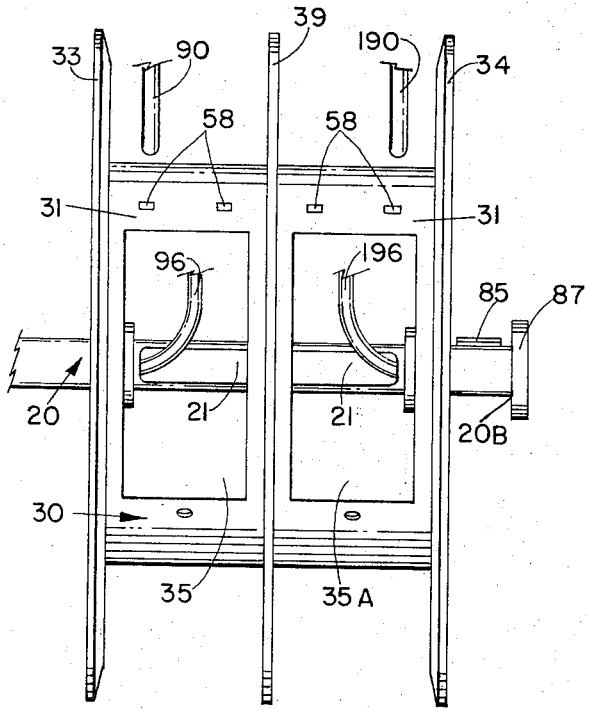
FIGURE 10 is a top plan view similar to that of FIGURE 8 for the twin cables reel embodiment.

The twin cables reel embodiment 99 of FIGURES 9 and 10 is adapted to simultaneously carry and pay out a pair of output power cables. For example, the pair of output cables may include the multi-conductor cable 90 and a tubular cable 190, said tubular cable 190 being adapted to carry fluids of various kinds. If cable 190 were to carry an inert gas, and cable 90 were to carry electrical energy, twin cables reel embodiment 99 would be admirably suited to power an external electric welding apparatus.

The twin cables reel embodiment 99 differs from embodiment 9 in the following respects: spool 30 includes an intermediate flange 39 located between terminal flanges 33 and 34; drum band 31 has a pair of openings, including opening 35 between flanges 33 and 39 and opening 35A between flanges 39 and 34; shaft medial slot 21, whether as one continuous slot as shown or as two separate slots, is in registry with both openings 35 and 35A; and there is an intermediate tubular cable 196 disposed internally along shaft 20 between second end 20B and medial slot 21 in registry with opening 35A. In fact, that portion of embodiment 99 between intermediate flange 39 and housing 26 is substantially identical to embodiment 9 between flange 34 and housing 26.

Shaft second end 20B carries a collar member 87 having a threaded bore, and a tubular nipple 88 is threadedly engaged with the bore of collar member 87, nipple 88 communicating with shaft bore 28. A swivel type elbow 89 is attached to the second end of nipple 88 and a threaded terminal end of intermediate tubular cable 196 is attached to the threaded first end of nipple 88. Intermediate cable 196 is disposed between shaft second end 20B and drum band opening 35A. The internal passage of elbow 89 communicates with the internal passages of nipple 88 and intermediate tubular cable 196, and thus, the combination of elements 88, 89, and 196, provide a revolvable joint between an input power cable 192 and output power cable 190. Drum band opening 35A is provided with a removable adapter cover 50 and intermediate cable 196 and output power cable 190 are attached together at cover member 50 with conventional fittings that are appropriate to fluid-carrying tubular cables.

From the foregoing, the construction and operation of the cable take-up reel will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A cable take-up reel for an output power cable comprising:
(A) a frame member including at least one side panel,
(B) an elongate shaft revolvably supported by the at least one side panel of the frame member, said elongate shaft being revolvable about the longitudinal central axis thereof, said shaft having a bore along the longitudinal axis commencing at the shaft first end, said shaft having a medial lateral slot intersecting said longitudinal bore,
(C) a spool member surrounding said elongate shaft and integrally joined thereto so as to be directly revolvable with said shaft, said spool having a fixed longitudinal relationship along said shaft, said spool member comprising a cylindrical drum band and a pair of opposed flanges integrally attached to the respective ends of the intervening drum band, said drum band having a lateral opening overlying the medial lateral slot of the elongate longitudinal shaft,
(D) a stationary housing attached to the frame member for protectably surrounding the elongate shaft first end, said housing including an entrance ring portion for passage of an input power cable to the shaft first end,
(E) revolvable joint means for conveying the power from the input power cable to the output power cable, said revolvable joint means including an intermediate power cable leading from the shaft medial lateral slot and having a terminal end at the drum band opening, the terminal end of the intermediatae cable at the drum band opening having a coupling device to engage the output power cable,
(F) a cover member removably attached to the spool drum band across the lateral opening thereof, said cover member including an opening for passage of the output power cable, the coupling device at the terminal end of the intermediate cable being attached to the interior side of the cover member, and
(G) a spring means removably attached to the exterior side of the frame member side panel adjacent to the elongate shaft second end, said spring means being connected between the frame member and the second end of the elongated shaft.

2. The cable take-up reel of claim 1 wherein the frame member includes a base portion adapted to rest stably upon a horizontal surface and two opposed side panels integrally attached to said base portion; wherein the input, output, and intermediate cables each include a plurality of internally disposed distinct electrical conductors; wherein the elongate shaft passes through and is revolvably supported by the frame member opposed side panels; wherein the stationary housing is attached to the outward side of the first side panel and encloses the first end of the elongate shaft; wherein the revolvable means includes a collector ring attached to the elongate shaft first end, said collector ring comprising a plurality of parallel metallic member rings, each of said member rings being concentric about and revolvable with the elongate shaft, the intermediate power cable being disposed within the longitudinal bore of the elongate shaft, the first end of the intermediate power cable being connected to various member rings of the collector ring, the second end of the intermediate power cable at the drum band opening being provided with an electrical socket coupling device that is attached to the interior side of the cover member, and wherein the spring means is a helical spring contained within a disc-like casing comprising two mating circular portions including an inward portion and an outward portion, the inward portion being non-revolvably attached to the exterior side of a frame member side panel.

3. The cable take-up reel of claim 2 wherein the outward end of the helical spring is attached to the outward portion of the casing and wherein the respective mating portions of the casing are each provided with a plurality of outwardly extending perforate ears, the said mating portions being attached together with removable fasteners passing through aligned perforations of said ears whereby the outward portion may be revolved parallel to the plane of the helical spring.

4. The cable take-up reel of claim 2 wherein the elongate shaft longitudinal bore is coextensive with the entire length of said shaft and wherein the second end of the elongate shaft includes a terminal slotted portion whereby the inward end of the helical spring may engage the wall of the elongate shaft near the second end thereof.

5. The cable take-up reel of claim 2 wherein the second end of the elongate shaft includes a tangential lip attached to the exterior side of said shaft whereby the inward end of the helical spring may engage said tangential lip.

6. The cable take-up reel of claim 2 wherein the cover member is of curvilinear shape to match the contour of the cylindrical drum band, the interior concave surface of the cover member abutting the drum band, the cover member exceeding the dimensional size of the drum band opening, the cover member including a tab portion extending inwardly of the cover member to provide the opening for the output power cable, the rearward end of the cover member including a plurality of prongs disposed beneath the drum band at the rearward end of the drum band opening, the concave interior side of the cover member including a strain relief clamp disposed between the cover member opening and the integral electrical socket; wherein the outward end of the helical spring is attached to the outward portion of the casing and wherein the respective mating portions of the casing are each provided with a plurality of outwardly extending perforate ears, the said mating portions being attached together with removable fasteners passing through aligned perforations of said ears; wherein the elongate shaft longitudinal bore is coextensive with the entire length of said shaft; and wherein the second end of the elongate shaft includes a terminal slotted portion whereby the inward end of the helical spring may engage the wall of the elongate shaft near the second end thereof.

7. The cable take-up reel of claim 2 wherin the cover member is of curvilinear shape to match the contour of the cylindrical drum band, the interior concave surface of the cover member abutting the drum band, the cover member exceeding the dimensional size of the drum band opening, the cover member including a tab portion extending inwardly of the cover member to provide the opening for the output power cable, the rearward end of the cover member including a plurality of integral prongs disposed beneath the drum band at the rearward end of the drum band opening, the concave interior side of the cover member including a strain relief clamp disposed between the cover member opening and the integral electrical socket; wherein the outward end of the helical spring is attached to the outward portion of the casing and wherein the respective mating portions of the casing are each provided with a plurality of outwardly extending perforate ears, the said mating portions being attached together with removable fasteners passing through alinged perforations of said ears; and wherein the second end of the elongate shaft includes a tangential lip attached to the exterior side of said shaft whereby the inward end of the helical spring may engage said tangential lip.

8. The cable take-up reel of claim 5 wherein the spool member includes an integral intermediate flange between the respective ends of the drum band; wherein the drum band has a pair of openings, one on either side of the intermediate flange; wherein the respective drum band openings are in registry with medial slotted portions of the elongate shaft; and wherein an intermediate tubular cable is disposed internally within the elongate shaft nearer to the second end thereof, one end of said intermediate tubular cable being attached to a cover member for a drum band opening and communicating with a tubular output power cable attached to the same cover member.

References Cited
UNITED STATES PATENTS

| | | | |
|---|---|---|---|
| 2,543,176 | 2/1951 | Komassa | 191—12.2 |
| 2,647,960 | 8/1953 | Benjamin | 191—12.4 |
| 3,056,863 | 10/1962 | Johnson | 191—12.4 |
| 3,061,234 | 10/1962 | Morey | 191—12.2 |

ARTHUR L. LA POINT, *Primary Examiner.*

D. F. WORTH, *Assistant Examiner.*